(12) United States Patent
Gorman

(10) Patent No.: US 6,462,696 B1
(45) Date of Patent: Oct. 8, 2002

(54) RADAR APPARATUS

(76) Inventor: Michael Gorman, Lordship Farm, West Wratting, Canbridge (GB), CB1 5LT ( * ) Notice: Subject to any disclaimer, the term of this patent is extended or adjusted under 35 U.S.C. 154(b) by 0 days.

(21) Appl. No.: 09/701,975

(22) PCT Filed: Jun. 1, 1999

(86) PCT No.: PCT/GB99/01745

§ 371 (c)(1),
(2), (4) Date: Dec. 1, 2000

(87) PCT Pub. No.: WO99/63361

PCT Pub. Date: Dec. 9, 1999

(51) Int. Cl.$^7$ .............................. G01V 3/12; G01S 13/88
(52) U.S. Cl. ............................ 342/22; 342/21; 342/176; 342/195
(58) Field of Search .............................. 342/21, 22, 27, 342/175, 195, 176–186, 194, 196, 197

(56) References Cited

U.S. PATENT DOCUMENTS

| | | | | |
|---|---|---|---|---|
| 3,102,232 A | * | 8/1963 | Leonard et al. ........... | 342/22 X |
| 4,062,010 A | * | 12/1977 | Young et al. ............... | 342/21 |
| 5,051,748 A | * | 9/1991 | Pichot et al. ............... | 342/22 |
| 5,463,597 A | * | 10/1995 | Harlev ...................... | 342/22 X |
| 5,904,210 A | * | 5/1999 | Stump et al. ............. | 342/22 X |

* cited by examiner

Primary Examiner—Bernarr E. Gregory
(74) Attorney, Agent, or Firm—Fildes & Outland, P.C.

(57) ABSTRACT

The invention provides a man-portable, non-ground-contacting, ultra-wide band impulse radar system (1), the system having separate transmit and receive antennae located in a common non-metallic housing (2) mounted at one end of a lightweight boom (3), them being a data-processing computer and battery housing (4) mounted at the other end of the boom (3) end acting as a counterweight to the antennae system (2), and the there being a data display and control unit (6) mounted generally centrally of the boom (3), the boom (3) being attachable to an ergonomic harness by which the whole may be carried by an Operator so that the data display and control unit (6) is in clear view of the Operator, and having one or more handle by which the whole may be grasped and swung from side to side while being so carried.

12 Claims, 2 Drawing Sheets

RADAR APPARATUS

DESCRIPTION

1. Field of the Invention

This invention relates to radar apparatus, and more specifically to such apparatus useful in the location of underground pipes and other 'buried assets'.

For as long as utilities (pipes, cables, drains, etc.) have been laid underground the problems of thereafter detecting their location has existed. Very old pipes, such as water mains, for example, may have been laid decades ago when records were not kept and even in modem times, when the locations of laid utilities should have been well defined, the data are often found to be inaccurate.

When maintenance is required, or new utilities are to be laid, damage may be caused to the existing services by excavation. Recently there has been an increase in the amount of laying of such services with the advent of fibre-optic communications and, therefore, there is a strongly increased demand for accurate location information about all existing utilities laid along a pipe's proposed route. Various types of locators have been in use for many years, however these, in general, yield only the surface trace of the utility, giving little or no information about depth, and such locators are not at all reliable where plastic pipe is laid.

2. Description of the Prior Art

Beginning about 25 years ago, short range or so-called 'impulse' radar was used for the survey of underground utilities. This is commonly known in the art as Ground Penetrating Radar (GPR). More recently the term Surface Penetrating Radar (SPR) has come into use although the terms are synonymous GPR is used in this document. GPR works as other radar systems, sending out short radio pulses and receiving the echoes following interaction of the signal with an object.

Acceptance of GPR use has not been very widespread amongst utilities survey organisations because previous and existing GPRs have been subject to a number of problems and disadvantages which will nova be considered.

Hitherto, all commercially available GPRs used for surveys of utilities have been systems which required the antennae to be in contact with the soil or surface being surveyed. The antennae are dragged or rolled along the surface to scan the area of survey. This requirement gives rise to significant difficulties if the surface is anything other than smooth or has obstacles thereon. In an urban environment, pavements and kerbs disrupt the 'drag-scan', while on greenfield sites, heavy vegetation or significant roughness, e.g. ploughed surfaces, may effectively rule it out.

Previous GPR systems for utilities survey have used radar systems which are comparatively narrow band. Thus, the typical frequency range which is used in such systems is of the order of ca. 100 to 1000 MHz. This range has to be covered by multiple antennae systems, wherein each antennae set, that is transmit and receive antennae, is specific to a particular range, for example a choice of 80, 120, 300, 450, 600 or 900 MHz for one common system. The problem with this approach is that the absorption of radar energy in the soil is crucially dependent on moisture content, with higher frequencies being very heavily absorbed by wetter soils. In general, one would like to use the highest possible frequency, so as to optimise the resolution of the image from the soil and its contents, i.e. the higher the frequency the greater the definition. This factor is dictated by the physics of wave transmission and the dielectric properties of materials.

With the narrow band systems currently in use, one is required to predict the soil properties and choose the appropriate antennae, so hopefully to yield the optimum result. However, if the soil is wetter than predicted, no echoes may be visible at all, necessitating a complete re-survey. Alternatively, if the soil is dryer than predicted, the highest possible resolution will not have been obtained. Therefore it is unlikely that the actual return signal will be sufficient for the purpose in hand and hence is very unlikely to have the optimal resolution.

Existing GPR systems for utilities survey mostly consist of at least two, usually three, separate units, interconnected by trailing cables. Thus, an antennae unit is connected to a controller unit, and usually to a recorder and/or separate power unit. This approach has obvious problems for portability and ease of use and, practically speaking, requires a crew of at least two for normal operation. Often, these heavy and excessive power-consuming units are placed in the back of a vehicle, but, in this case, the radius of operation is strictly limited by the length of the connecting umbilical cables. Moreover, when a system is provided as a single unit they are heavy, "lawnmower" type systems with ground contact antennae.

Typical GPR Systems currently in use produce either a low dynamic range paper record on a large and power-hungry recorder, or they produce an output on a CRT screen. Either display is at a unit remote from the operator who is actually scanning with antennae over the survey area. This means there is not an immediate feedback of the survey results to the operator. Typically, marks are manually placed an the record and these are correlated with surface features, more or less reliably, by the operator after completion of the survey. Furthermore, in conventional systems which have a near real-time display the display is cumbersome and has been found to be awkward to use.

SUMMARY OF THE INVENTION

Accordingly it is an object of the present invention to overcome or, at least, substantially reduce the problems associated with the prior art systems discussed above.

According to the invention there is provided a man-portable, non-ground-contacting, ultra-wide band impulse radar system, the system having separate transmit and receive antennae located in a common non-metallic housing mounted at one end of a lightweight boom, there being a data-processing computer and battery housing mounted at the other end of the boom and acting as a counterweight to the antennae system, and there being a data display and control unit mounted generally centrally of the boom, the boom being attachable to an ergonomic harness by which the whole may be carried by an operator so that the data display and control unit is in clear view of the operator, and having one or more handles by which the whole may be grasped and swung from side to side while being so carried.

Additionally, the system may comprise custom-designed miniaturised electronics and it provides a completely man-portable system with usage unlimited by weight, manoeuvrability or distance from power sources. By using "air-launch" antennae, it enables the radar radio waves to be transmitted through the air and then into the ground, it subsequently processes the received reflections and displays the data in very nearly real time, and by determining a phase difference in displayed hyperbolae, discriminates plastic pipes and their contents by detecting the interface between materials rather than the material itself.

Preferably, the antennae system comprises two copper leaves cut into complex, matching shapes and mounted at a precise angle and distance from each other. Each antenna may be a tapered impedance travelling-wave antenna using parallel-plate transmission lines together with a wide-band balun at the antenna input.

Furthermore, a radio pulse generator capable of providing a pulse covering, for example, the entire 100 to 1999 MHz band may be coupled to the transmit antenna, and a sampler may be coupled to the receive antenna. Additionally, the pulse generator may provide a monocycle pulse.

The sampler may possibly be a low-noise equivalent-time sampler, with a sampling unit being embedded in digital delay control circuitry, to scan that required delay range. Also, each of the generator and sampler may be mounted directly on its antenna and the data display unit may include a liquid crystal display device. dr

BRIEF DESCRIPTION OF THE DRAWINGS

An embodiment of the radar apparatus in accordance with the invention will now be described by way of example only and with reference to the accompanying drawings in which.

DETAILED DESCRIPTION OF THE INVENTION

Figure 1:
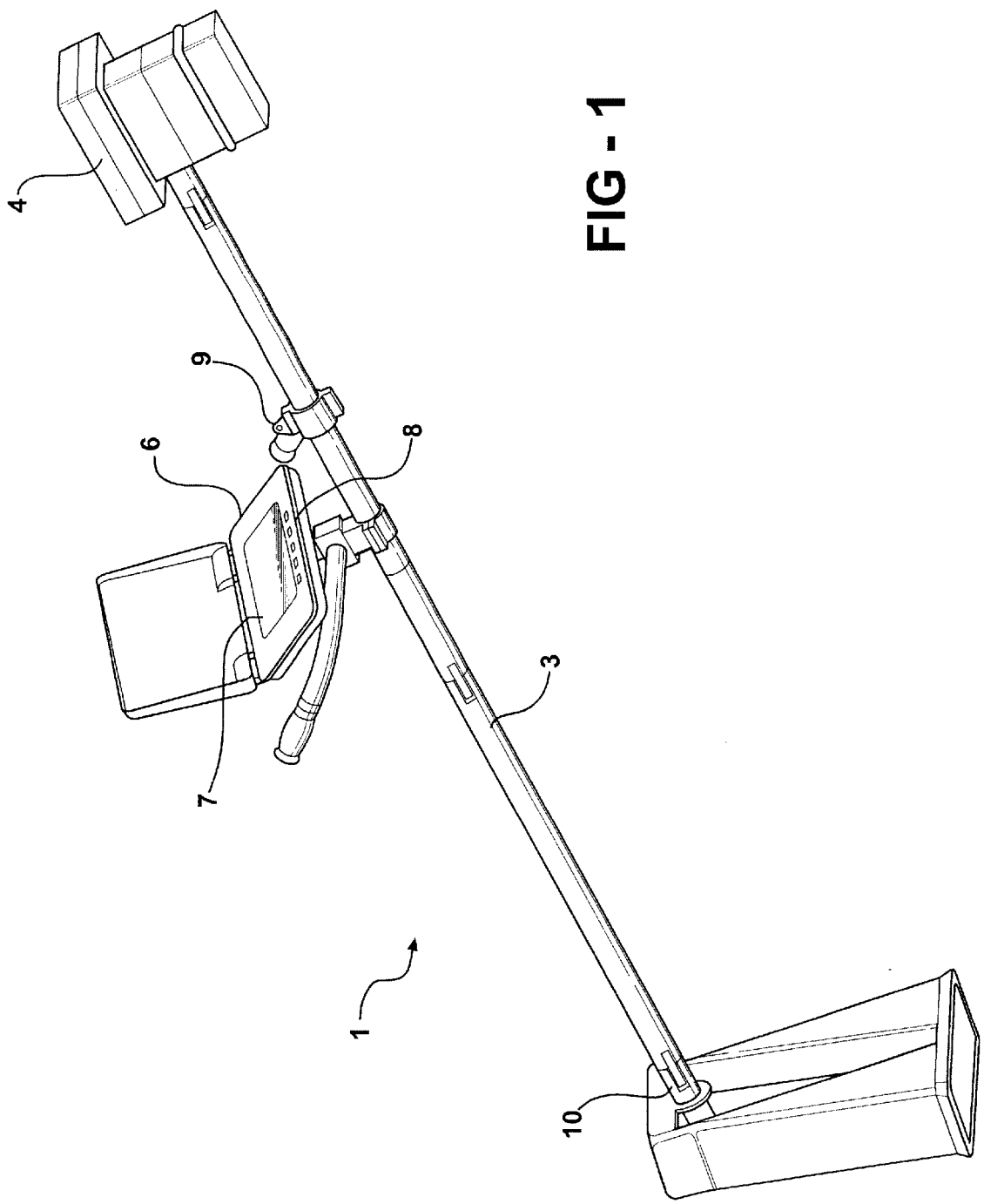
FIG. 1 shows a side elevation of the ground penetrating radar system.

Referring firstly to FIG. 1, the radar system, generally indicated at 1, comprises a radar transceiver 2 located at an end of a lightweight boom 3. Located at the other end of the boom 3, is a housing 4 containing a data processing and power supply unit 5, which housing 4, and the associated unit 5, is removable from the boom for easy stowage. Mounted on the boom 3 is a display and control unit 6 comprising a lightweight screen housing with a liquid crystal display (LCD) screen 7 which allows an operator to view data and furthermore provides an array of system membrane parameter switches 8.

The boom 3 is also provided with a harness connection point 9 from which an ergonomic harness can be attached. The connection point comprises a metal tube clamp and a loop from which the harness, which is constructed from plastic and webbing and is a bought in fill' X' harness with waist band and hip/pressure pad, is attached.

The boom 3 is constructed from non-metallic tube material, which may have a surface colour, for example, yellow for reasons of visibility. The interconnecting cables pass down the centre of the tube to connectors 10, which are mounted in the tube-end, to ensure an electrical connection between the components. The tube, which is provided with collar stops at each end to maintain a set length, penetrates into mating sockets at the transceiver 2, the display and control unit 6 and processor housing 4.

Figure 2:
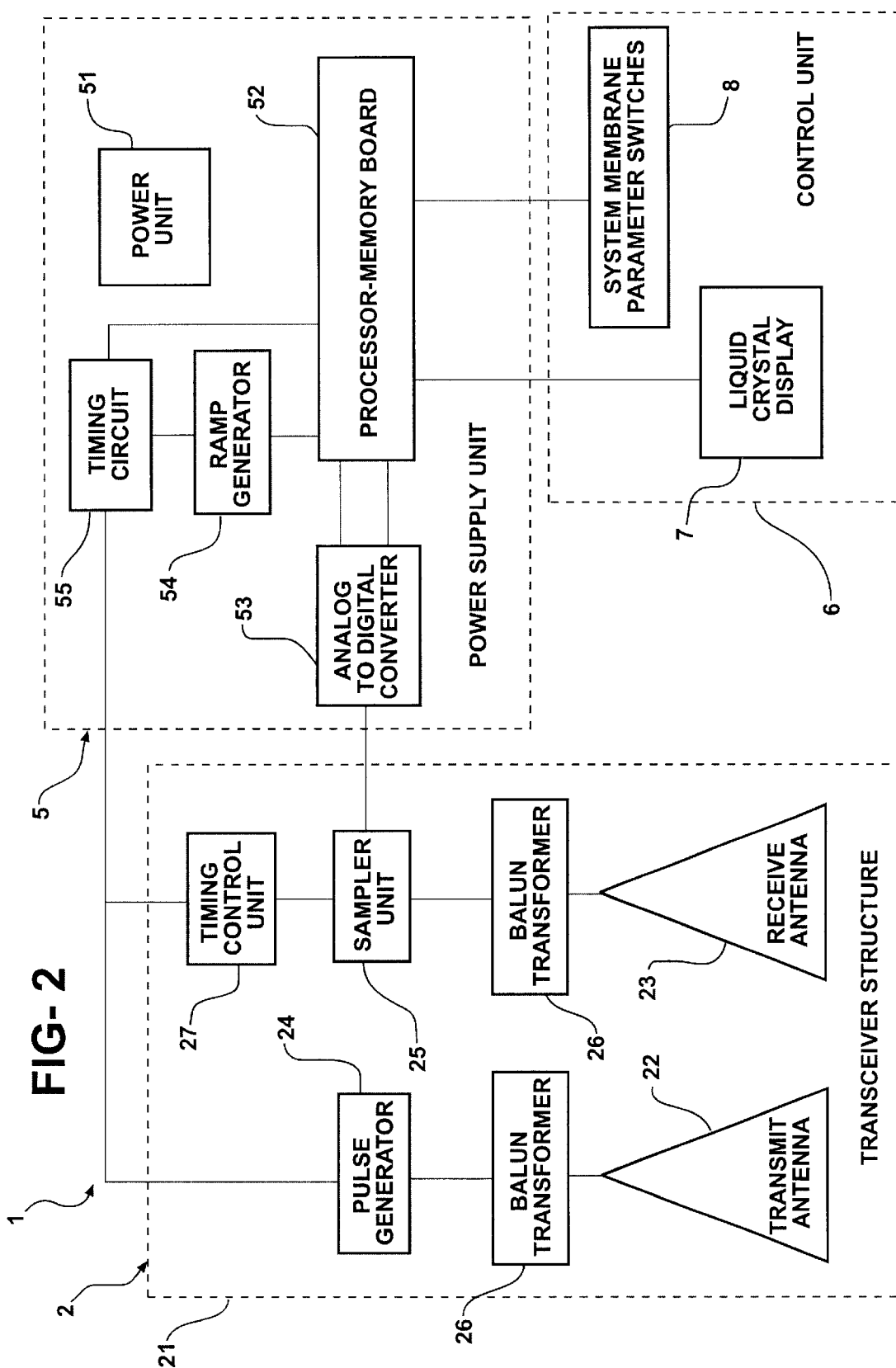
FIG. 2 shows a block diagram of the components of the ground-penetrating radar system.

Referring now to FIG. 2, the components of the system 1 are indicated in block fashion, with the radar transceiver 2, data processing and power supply unit 5 and the display and control unit 6 clearly indicated.

The radar transceiver 2 is housed in a lightweight, rigid, non-metallic structure 21 with separate antennae within the housing used to transmit 22 and receive 23. The transmitter, or pulse generator, 24 and receiver, or sampler unit, 25 are mounted directly on their respective antennae 22, 23. This direct mounting of the respective components avoids problems with reflections in feeder cables, which can be particularly severe in impulse radar systems.

The principle design constraints of the radar system 1 are that it is of ultra-wide bandwidth, and that the antennae 22, 23 should not be required to be in contact with a surface being surveyed. Both of these factors are intimately related to the antennae design, and novel antennae 22, 23, described as a tapered impedance travelling-wave type, were designed and developed. These antennae 22, 23 use shaped parallel-plate transmission lines to radiate the energy, effectively matching the 50 ohm coaxial input to free space. A wide-band balun 26 at the antenna input balances the currents between the unbalanced coaxial input and the balanced transmission line structure Several approaches are possible to provide ultra-wide bandwidth energy for the transmitter. The approach chosen has been to use a monocycle (a single cycle of a sine wave). In addition to having useful energy over a bandwidth equal to approximately twice the frequency of the sine wave, it has the particular merit of having very small energy at very low frequencies, which even an ultra-wide bandwidth antenna cannot radiate. This avoids problems with dissipation of this energy which can obscure the records.

The receiver 23 must also be of ultra-wide bandwidth and, to this end, a low noise equivalent-time sampling system was chosen. A commercially available sampling unit was embedded in novel digital delay control circuitry, to scan the required delay range. The delay range is controllable by digital outputs from the processing unit 5.

The radar/antennae assembly 2 is constructed from non-metallic components. The nucleus of the assembly 2 consists of two pairs of fibre-glass 'PCB' sheets, the copper sides facing each other at an acute angle but spaced at the fulcrum by 3 mm. Located in this 3 mm space is the balun transformer 26 (soldered to the PCBs and an SMA connector; this small assembly is encapsulated). Transmitter/receiver circuits are mounted on a PCB located between the antennae 22, 23.

To overcome the problems associated with the ground-contacting antennae of existing systems mentioned above, the inventive apparatus uses a novel air-launched pulse antennae system. Two copper leaves cut into complex, matching shapes are mounted within the antennae housing 10 at a precise angle and distance from each other. It is the design of these leaves that lies at the heart of the 'air-launch' antennae. The pulse generator 24 provides the input and the sampler 25 provides the output, with both being coupled to the leaves.

The data processing and power supply unit 5 comprises a battery and power unit 51, processor and memory board 52, 16-bit analogue to digital converter 53, ramp generator 54 and a timing circuit 55. The 24 V, 5 AH removable and rechargeable battery supplies the power for the entire system and its interface comprises a DC–DC convener, enclosed in a screened housing fitted with feed-through filters, which provides +5 V DC and ±15 V DC. The unit 5 is attached to the opposite end of the boom 3 from the antennae 2, to act as a counter-weight thereto and thereby allows an operator to use the system 1 with comfort. The processor card is a standard PC/104 format card, that chosen is the TC586 from DSP design. The radar interface card is fabricated in-house.

The display and control unit 6 is provided with a standard commercial monochrome LCD display 7 offering 16 or more grey scales per pixel. The display typically has a viewable area of 217 mm by 358 mm and a resolution of 640 by 480 pixels and it may be back-lit. The VGA pixel area is divided into three regions for the GPR data display. The top 24 lines of pixels are for screen headings, error and warning messages The middle 256 lines are reserved for the radar image and the bottom 200 lines are used for the soft keys and Menus. Six membrane parameter switches 8 are provided with separate scan switches all configured to present a parallel interface to the processor. This port is resident on the Radar Interface Card.

The data processing unit is provided with a software suite which allows control of both the collection of data and processing of the data so collected.

The operating software, through which the operator adjusts the settings and controls of the system, comprises the following functions;

(a) Radar Range. A parameter which controls the depth to which the radar searches. The system 1 will always take 256 readings, so this setting effectively controls the depth granularity. A small depth setting gives finer detail over a shorter distance than a large Betting. The setting is passed to the Processing Software, but also affects data acquisition.

(b) Display Sensitivity. This accounts for the fact that the display is capable of displaying only a limited number of grey levels. The 16 bit resolution processed data therefore needs to be mapped onto this limited display resolution. The parameter specifies the number of bits of processed data which map onto a single display grey level. The effect of this parameter is to change the contrast of the display.

(c) Attenuation Constant (dB·m−1). This is an estimate of the signal loss expected through the soil. It is used by the Processing Software to balance the signal strength as depth increases to provide even response throughout the range of the radar. The values selected will always pre-set to the middle value in the range and will start the selection at the current setting.

(d) Soil Type. This allows for the effect of moisture content of the soil or other material, which affects the velocity of the radar (radio) waves through the soil. The more moisture in the soil, the slower the waves travel. This affects the depth estimation determined from the radar signal timing. The operator is therefore required to enter a subjective estimate of this parameter. Such judgements are based on experience and the settings allow experimental variation through a number of sweeps so as to optimise the image.

(e) Sweep Granularity. This is controlled by the speed of movement of the radar over the surface being surveyed and the interval between scans into the soil taken by the radar. A faster speed will cover a larger distance in one sweep. However, it is more convenient, and produces less blurring, if the interval is varied between scans to achieve the same objective. This parameter is varied by the operator to produce a varying sweep length, effectively spreading the sweep's 160 scans over a wider area. In this way a trade-off between sweep distance and detail (hence granularity) is achieved (f) Re-Process Option. This is used after the data from a sweep has been acquired and processed (all of this being in nearly real-time) to try to improve the image quality. All but the Radar Range parameter may be modified and the same data reprocessed to try to enhance the information content of the image It is therefore an optimising process.

The digitised radar data are passed to a proprietary processing software routine which operates upon the data and generates the image for viewing by the operator. Among the operations carried out are:

(a) Time Alignment of the individual scans;
(b) Fast Fourier Transform filtering to remove out-of-band signals,
(c) Constant System Echo Processing; and
(d) Gain Adjustment to allow for losses in the soil.

Given a requirement to either locate a pipe or cable duct so as to excavate efficiently in order to carry out repair or inspection, or survey in advance of trenching, for example, for automatic pipe or cable laying, an operator carrying the inventive radar apparatus would do the following.

(a) Assemble the apparatus from the component subsystems described above and, having first put on the harness, attach the harness link to the beam and hanger on the apparatus. Switch the system on and, having made a judgement on the nature of the material to be surveyed and its moisture content, adjust the controls. Standing at the required survey point or start point of a survey line, swing the antennae over an are of between two to three metres the start control button being pressed on commencing the sweep and released on completion.

(b) After an interval of some seconds the imaged sweep, or swath, will be represented on the display screen in a pixel map. The image will reveal layers of differing dielectric qualities in black and white pixels. Objects such as pipes or cables will show as hyperbolae also picked out in black and white pixels. The operator can relate the position of the detected object on the display to that point on the survey arc. This operation can be repeated along the line of a pipe, etc. by incrementally advancing using each successive detection to track the line of pipe lay. Simple surface marking, such as spray paint, can map the detected object with sufficient accuracy for trenching or buried asset avoidance.

(c) The inventive apparatus is designed specifically as a 'locator' for in field use but may also store data for future/further analysis.

In this system 1 the pulse duration is 2.2 nanoseconds with a centre frequency of 500 MHz. Timing the reflections from any change in material encountered by the pulse as it radiates outwards, and knowing the radio wave velocity of the material through which it travels, enables calculation of the range (distance) to a change in material. That is, the interface between materials with different electromagnetic pulse transmission (dielectric) properties may be found. Thus, a pipe in soil reflects a portion of the energy incident upon it, and its three-dimensional location is mapped. The data are processed and presented to the operator in a form which appears, to a first-approximation, as a cross-section through the soil along the survey line.

The radar/antennae unit is hand-swung over the area to be surveyed, the display is produced in near real time just seconds (e.g. 3–4 s) after the sweep is completed. Depth of detection depends upon the size and character of target and tile conditions of the soil, but may be in excess of 2 metres. If target is large relative to the wavelength and presents corner reflectors it is more easily detected. The higher the level of soil moisture the worse the radar performance as the radio waves are attenuated by moisture. Metallic pipes may be distinguished from plastic by the character of the echo, as may fluid filled pipes be distinguished from empty by detecting the interface between materials rather than the material itself and by discriminating the phase difference in the displayed hyperbolas. Furthermore, a range of additional information is available about sub-surface features Problems associated with the use of narrow-band antennae, as described with reference to prior art systems, are addressed by the inventive air-launch radar apparatus, viz; an ultra-wide bandwidth design, covering the entire 100 to 1999 MHz band in a single antennae unit. Thus, energy is present at all the frequencies, and the survey will always yield the best resolution which the soil or other material conditions will permit. Wet soils will absorb the high frequencies, but the low frequencies are present, yielding a low resolution image Conversely, dry soils will pass all frequencies, yielding a high resolution image.

The system 1 provides the single operator, in a convenient manner, immediate and clear results which can be directly related to the sub-surface situation. The apparatus comprises a portable non-ground-contacting, lightweight, man-portable, ultra-wide-band impulse radar system using separate transmit and receive antennae located in a common non-metallic housing.

The invention therefore provides: a new apparatus, namely a novel development of a type of lightweight, ultra-wide band antennae, a new combination of devices, namely, the said antennae, a new processing unit & display system, supported by unique software on a single man-portable mounting and deployment system, and a new man-portable radar system for the location of and survey of a wide range of buried utility assets, such as pipes and the like, with convenience of use, immediate presentation of results, and high level of confidence in the data. The apparatus is also not restricted to underground utility assets but also those buried within non-horizontal surfaces, e.g. walls, and can operate at any hand-held height above the surface, enabling the operator to scan smoothly and quickly across any survey area with no interruption or physical difficulty.

What is claimed is:

1. A portable, non-ground-contacting, ultra-wide band impulse radar system comprising an assembly having separate transmit and receive antennae located in a common non-metallic housing mounted at one end of a boom, a data-processing computer and battery housing mounted at the other end of the boom and acting as a counterweight to the antennae assembly, a data display and control unit mounted generally centrally of the beam which is adapted to be attached to an ergonomic harness by which the system is portable by an operator so that the data display and control unit is in clear view of the operator, and one or more handles by which the system is adapted to be grasped and swung from side to side.

2. A system as claimed in claim 1 further comprising:
   custom-designed miniaturized electronics providing a completely portable system with usage unlimited by weight, maneuverability or distance from power sources;
   air-launch antennae as the transmit and receive antennae of the antennae assembly adapted to enable radar radio waves to be transmitted through air and then into the ground, and the reflections received;
   means adapted to process and display the resulting data in substantially real time; and
   means arranged to determine the phase difference in hyperbolae displayed at the data display, thereby discriminating plastic pipes and their contents by detecting an interface between materials of different dialectric properties being surveyed by the system, rather than the material itself.

3. A system as claimed in claim 2, wherein the transmit and receive antennae assembly comprises two copper leaves cut into matching shapes and mounted at a precise angle and distance from each other, each antenna being a tapered impedance traveling-wave antenna using parallel-plate transmission lines together with a wide-band balun at the antenna input.

4. A system as claimed in claim 1, wherein the transmit and receive antennae assembly comprises two copper leaves cut into matching shapes and mounted at a precise angle and distance from each other, each antenna being a tapered impedance traveling-wave antenna using parallel-plate transmission lines, together with a wide-band balun at the antenna input.

5. A system as claimed in claim 1, wherein a radio pulse generator is adapted to provide a pulse covering the entire 100 to 1999 MHz band and is coupled to the transmit antenna, and a sampler is coupled to the receive antenna.

6. A system as claimed in claim 5, wherein the pulse generator is adapted to provide a monocycle pulse.

7. A system as claimed in claim 6, wherein the sampler is a low-noise equivalent-time sampler, a sampling unit being embedded in digital delay control circuitry, to scan a required delay range.

8. A system as claimed in claim 6, wherein the generator and sampler are mounted directly on their respective antennae.

9. A system as claimed in claim 5, wherein the sampler is a low-noise equivalent-time sampler, a sampling unit being embedded in digital delay control circuitry, to scan a required delay range.

10. A system as claimed in claim 9, wherein the generator and sampler are mounted directly on their respective antennae.

11. A system as claimed in claim 5, wherein the generator and sampler are mounted directly on their respective antennae.

12. A system as claimed in claim 1, wherein the data display unit includes a liquid crystal display device.

\* \* \* \* \*